June 12, 1956 K. W. COUSE 2,749,768
POWER TAKE OFF SHIFTING MEANS
Filed April 9, 1952 3 Sheets-Sheet 1
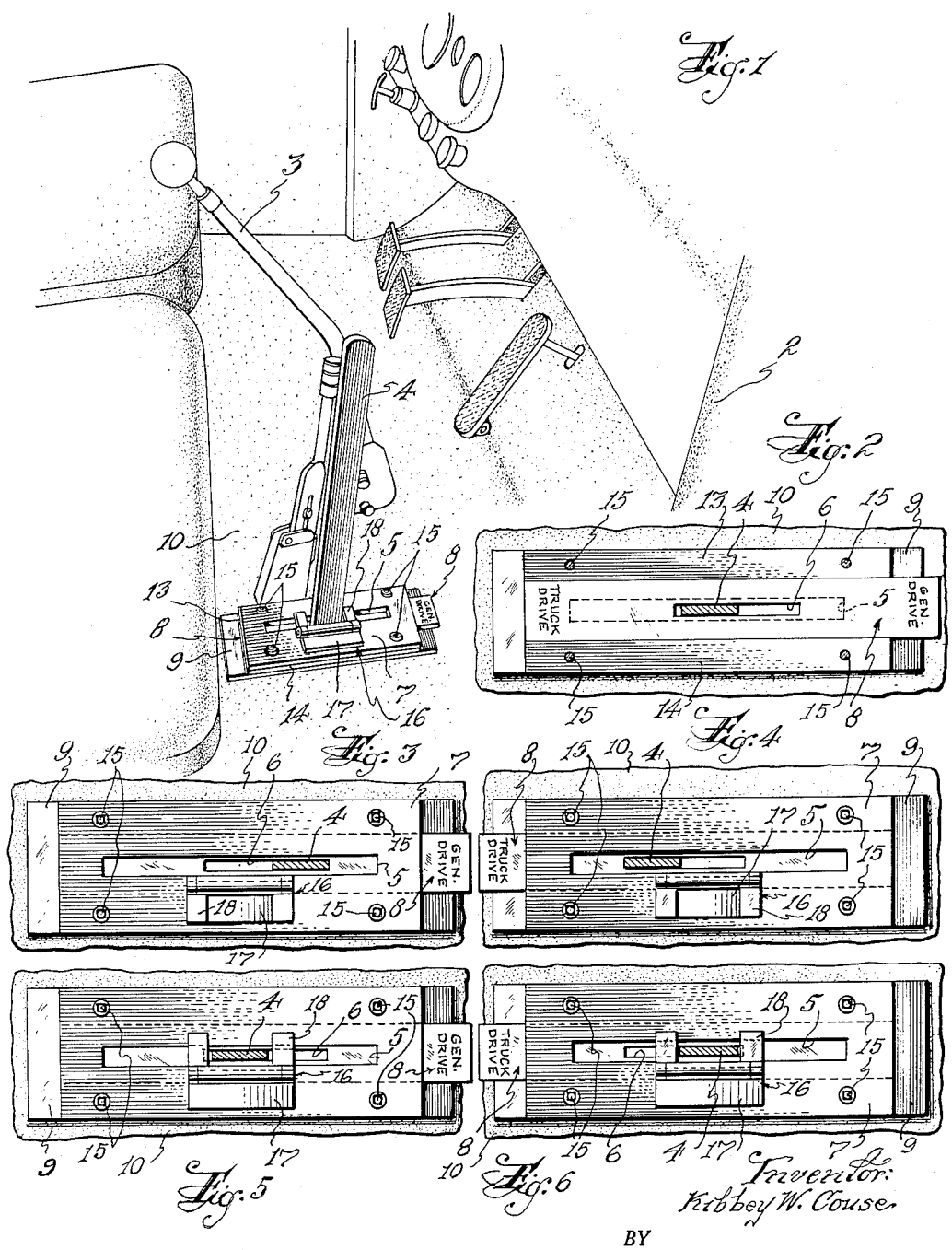
Inventor:
Kibbey W. Couse
BY
Attorney.

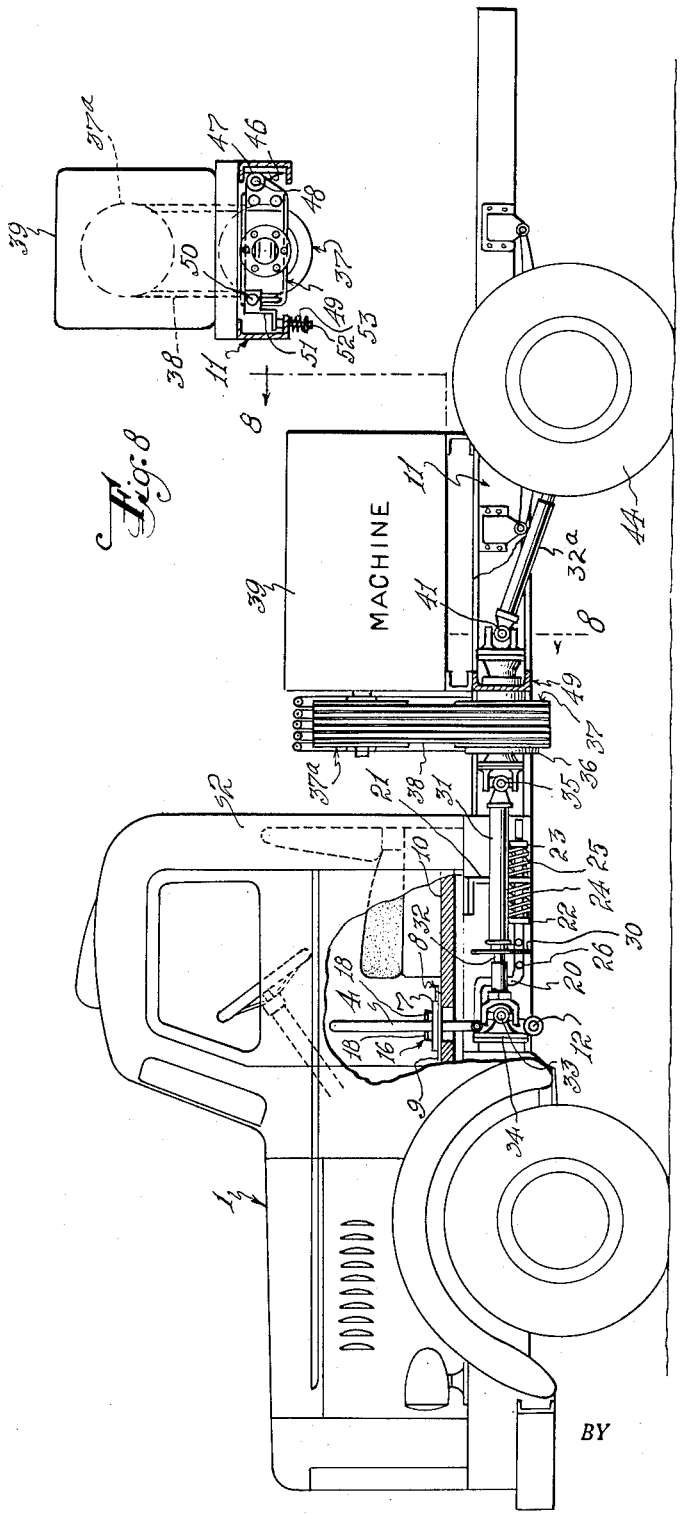

June 12, 1956     K. W. COUSE     2,749,768
POWER TAKE OFF SHIFTING MEANS
Filed April 9, 1952     3 Sheets-Sheet 3
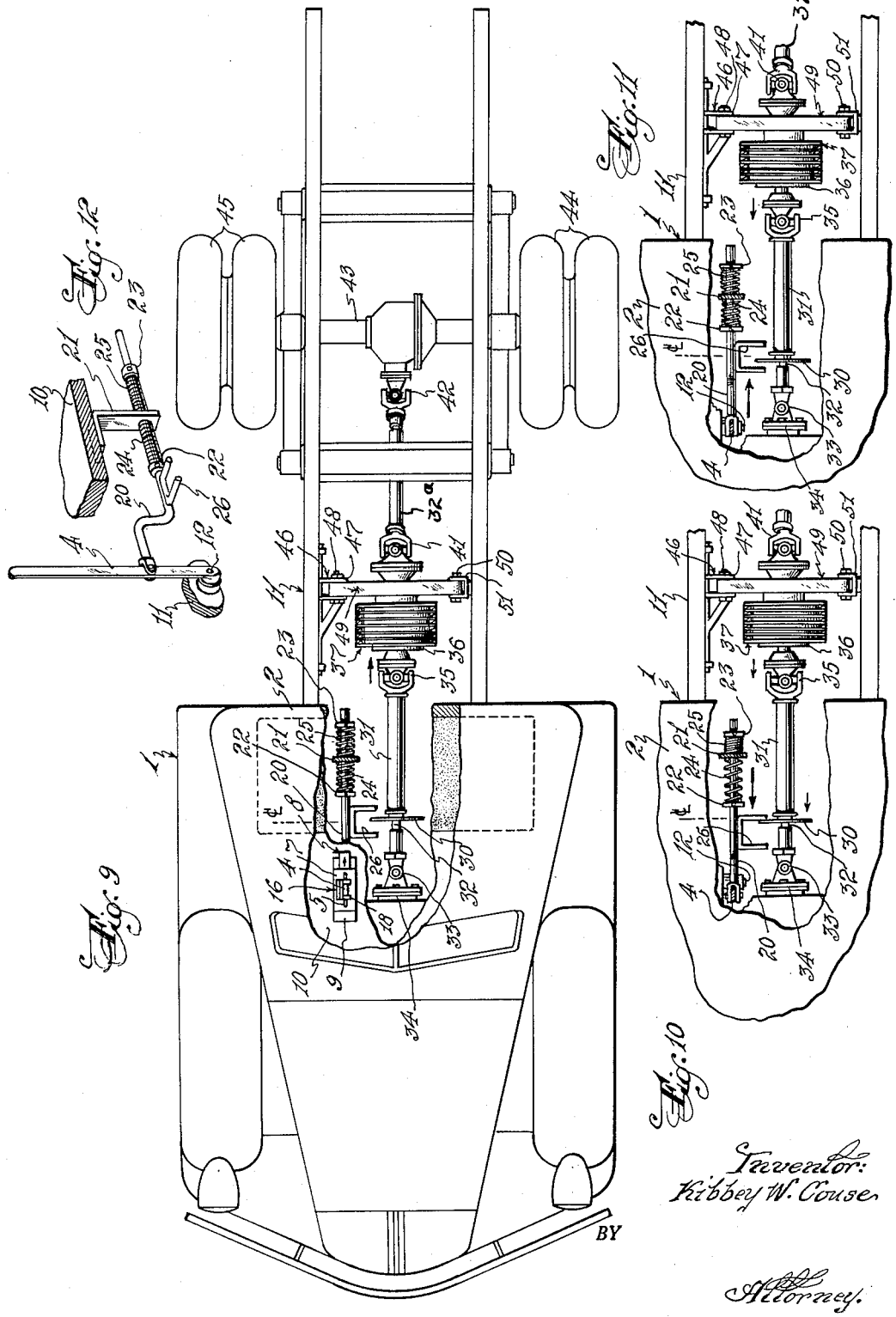
Inventor:
Kibbey W. Couse
BY
Attorney.

United States Patent Office 2,749,768
Patented June 12, 1956

2,749,768

POWER TAKE OFF SHIFTING MEANS

Kibbey W. Couse, Newark, N. J.

Application April 9, 1952, Serial No. 281,289

1 Claim. (Cl. 74—491)

My invention relates to power take off shifting means and has as its prime object the provision of novel and improved power take off shifting means wherein the shifting means is automatically restored to a normal or neutral position after the completion of a shifting operation.

It is another object of my invention to provide novel and improved power take off shifting means of the described type which power take off shifting means furnishes a positive indication of the operative condition of power take off apparatus controlled thereby and wherein means are provided for locking the lever of the shifting means in its neutral position.

Other objects and advantages of my invention will appear as the course of the specification develops.

To attain the objects and advantages of my invention I provide a shift lever having a normal or neutral position but operable to one or another extreme position which shift lever is operatively connected to an actuating member. The actuating member is adapted to engage an actuated member and to move such actuated member to one or another control position thereby effecting a switching operation, the aforesaid controlled positions corresponding to the extreme positions of the lever. The actuated member is operatively connected to power take off apparatus which is controlled in accordance with the position of the actuated member. Biasing means effect the restoration of the lever to its neutral position and the actuating member to a corresponding position upon the completion of a switching operation thereby disengaging the actuating and actuated members. Indicating means controlled by the lever furnish a positive indication of the operative condition of the power take off apparatus. I also provide suitable locking means for locking the lever in its neutral position to prevent the lever from being accidentally thrown in a shift position.

I shall describe one form of my invention and then point out the novel features thereof in the claim. In the embodiment of my invention shown and described herein my power take off shifting means is utilized to control the power take off apparatus of a traveling machine shop, that is, a motor vehicle, preferably a truck having a machine tool, compressor or other power driven machine mounted thereon and driven by the motor vehicle engine. It is to be recognized, however, that my power take off shifting means may also be utilized successfully in other environments and to control other power take off apparatus.

In the accompanying drawings is a perspective view of the interior of a truck cab showing the shift lever and other portions of my power take off shifting means installed therein. Figure 2 is a top plan view of the portion of my power take off shifting means installed in the truck cab, a cover plate having been removed therefrom. Figures 3 to 6 inclusive are top plan views of the portion of my power take off means installed in the truck cab which views show the parts in various operative positions. Figure 7 is a side elevational view of a traveling machine shop having its power take off apparatus controlled by my power take off shifting means. Figure 8 is a view taken along the line 8—8 of Figure 7. Figure 9 is a top plan view of the traveling machine shop of Figure 7 with the power driven machine removed therefrom. Figure 10 is a top plan view of a portion of the traveling machine shop of Figure 7 which view shows my shifting means in one of its extreme operative positions. Figure 11 is a view similar to Figure 10 but showing my shifting means in the normal or neutral position assumed thereby after the completion of a shifting operation. Figure 12 is a perspective view showing the shift lever and actuating member, and showing the biasing means for restoring the lever to its neutral position and the actuating member to a corresponding position upon the completion of a shifting operation.

Referring to the drawings reference character 1 designates a motor vehicle truck of the type suitable for carrying power driven machines such as compressors, drill presses, shapers and the like which are driven from the vehicle engine. Truck 1 has an operator's cab 2 and located in the cab near the gear shift 3 is another shift lever 4 which extends through slotted openings 5 and 6 in cover plate 7 and sliding plate 8 respectively, and through other slotted openings in a base plate 9 and the cab floor 10 to connect with the truck chassis 11, the lever 4 having its one end pivotally connected at 12 beneath cab floor 10 to the truck chassis. Base plate 9 is secured to the cab floor 10 and is provided with shims 13 and 14 which are disposed one on each side of plate 9. Plate 8 is slidably mounted between the shims 13 and 14 of plate 9, plate 8 being restrained against vertical movement by cover plate 7 which is positioned over plate 8 and is bolted through shims 13 and 14 to plate 9 by bolts 15.

Slot 5 of cover plate 7 is somewhat longer than slot 6 of sliding plate 8 and the slots in base plate 9 and cab floor 10 are at least as great in length as slot 5 so that sliding plate 8 may be moved by lever 4 as the lever is moved within slot 5, lever 4 and plate 8 being movable in one direction to one pair of extreme positions and movable in the other direction to another pair of extreme positions (Figures 3 and 4). Although slot 6 as already noted is shorter in length than slot 5, the length of slot 5 is sufficient to permit lever 4 to assume its normal or neutral position wtih plate 8 in one or the other of its extreme positions (Figures 5 and 6) in which neutral position lever 4 occupies a central position with respect to the length of slot 5. When slidable plate 8 occupies one extreme position one end portion thereof projects beyond one end of cover plate 9 and when slidable plate 8 occupies its other extreme position the other end portion thereof projects beyond the other end of cover plate 9. The projecting ends of plate 8 are marked "Gen Drive" and "Truck Drive" to indicate the operative condition of the power take off apparatus. Lever 4 is provided with a hinge locking device 16 comprising a fixed hinge portion 17 which is secured to cover plate 7 and a U-shaped movable hinge portion 18 pivotally connected to fixed portion 17 which movable portion may be flopped across slot 5 of cover plate 7 to confine lever 4 in its neutral position between the sides of member 18.

Lever 4 is connected intermediate its ends to a rod 20 which rod extends through an opening in a bracket 21 mounted upon the underside of cab floor 10. Mounted in fixed positions upon rod 20 are collars 22 and 23, collar 22 being disposed on rod 20 to one side of bracket 21 and collar 23 being disposed on rod 20 to the other side of bracket 21. Rod 20 is provided with a coil spring 24 which is positioned on the rod between collar 22 and bracket 21. Rod 20 is also provided with a coil spring 25 which is positioned on the rod between collar 23 and bracket 21. Springs 24 and 25 serve to position lever 4 in its neutral position and rod 20 in a position corresponding to the neutral position of lever 4. Obviously other biasing means might also be used to accomplish the purpose of coil springs 24 and 25. Mounted on rod 20 is a U-shaped actuating member 26 for moving a rotatable disk 30 to one position or another according to the position of lever 4. Rotatable disk 30 is mounted upon a cylinder 31 which cylinder is slidably mounted on drive shaft 32 and is also rotatable therewith. Drive shaft 32 is connected in the usual manner through a universal joint 33 to the truck transmission 34. Cylinder 31 is connected through a universal joint 35 to power take off apparatus 36. Power take off apparatus 36 is of such type that when cylinder 31 is moved to the left as viewed in Figure 9 by actuating member 26 to a position corresponding to the extreme right hand position of lever 4 as viewed in Figure 1, drive shaft 32 is operatively connected through cylinder 31, universal joint 35 and power take off apparatus 36 to a power take off drum 37, drum 37 being connected by suitable belt driving means 38 to another drum 37a for driving a machine 39 mounted upon chassis 11. When cylinder 31 is moved to the right as viewed in Figure 9 by actuating member 26 to a position corresponding to the extreme left hand position of lever 4 as viewed in Figure 1, drive shaft 32 is operatively connected through cylinder 31, universal joint 35, power take off apparatus 36 and universal joint 41 to shaft 32a, shaft 32a being connected through universal joint 42 and the usual differential gearing to the truck axle 43 which has wheels 44 and 45 mounted on opposite ends thereof.

Power take off apparatus 36 is supported by a web plate 49 which is pivotally mounted at 48 on lugs 47 which are secured to a supporting frame 46, frame 46 being secured in a fixed position on one side of chassis 11. Web plate 49 has a bracket 51 connected thereto at 50 which bracket engages one end of a plunger 52 extending through the other side of chassis 11 and coacting with spring 53.

Assume that shift lever 4 occupies its neutral position and that power take off apparatus 36 is positioned for driving machine 39. Assume further that it is desired to actuate power take off apparatus 36 so as to operatively connect drive shaft 32 through the power take off apparatus to the wheels of truck 1. The first step in accomplishing the desired results is to move shift lever 4 from its neutral position to the left as viewed in Figure 1 causing rod 20 and actuating member 26 secured to rod 20 to move to the right as viewed in Figure 9. Member 26 engages rotatable disk 30 and cylinder 31 as viewed in Figure 9 is moved to the right, which cylinder acting through universal joint 35 is effective to actuate power take off apparatus 36 so as to cause drive shaft 32 to be operatively connected through cylinder 31, universal joint 35, power take off apparatus 36 and thence through universal joint 41, universal joint 42 and the usual differential gearing to the axle 43 having wheels 44 and 45 mounted thereon. The truck is in this manner prepared for operation of wheels 44 and 45 by the truck engine. Upon completion of the shifting operation, lever 4 is returned to its neutral position by the action of springs 25 and 24 where it may be locked in position by locking means 16, rod 20 and actuating member 26 being returned to corresponding positions, thereby disengaging actuating member 26 and disk 30 so that the disk may be rotated free of the actuating member.

When it is desired to position power take off apparatus 36 for operation of machine 39 lever 41 is merely moved to the right as viewed in Figure 1 causing actuating member 26 to move disk 30 and cylinder 31 to the left as viewed in Figure 9. Cylinder 31 acting through universal joint 35 positions the power take off apparatus 36 so as to cause drive shaft 32 to be operatively connected through power take off apparatus 36, to power take off drum 37 and to the machine 39 through belt driving means 38 thereby preparing the way for the operation of machine 39 by the truck engine. Upon completion of the shifting operation, lever 4 is, of course, returned by springs 24 and 25 to its neutral position and rod 20 and actuating member 26 are returned to corresponding positions. As already noted, lever 4 may be locked in its neutral position by locking means 16. When lever 4 is operated to one or the other of its extreme positions to operate power take off apparatus 36 one end of slidable plate 8 is projected beyond cover plate 7 to indicate the operative condition of the power take off apparatus, the indication persisting after lever 4 is returned to its neutral position, such indication being changed only when lever 4 is moved into a different extreme position.

It will now be apparent that I have provided power take off shifting means effective for actuating power take off apparatus to one position or another which power take off shifting means has its lever returned to a neutral position and the other parts thereof returned to corresponding positions after the completion of a shifting operation to disengage the actuating and actuated members brought into contact during the shifting operation. It will be apparent also that a positive indication is always provided with my power take off shifting means of the operative condition of the power take off apparatus controlled thereby. As already noted, suitable locking means have also been provided for locking the shift lever in a neutral position and various other parts of the shifting means in corresponding positions.

Although I have herein shown and described only one form of my invention it is to be understood that various changes and modifications may be made therein within the scope of the appended claim without departing from the spirit and scope of my invention.

What I claim is:

In a combination, a shift lever operable in one direction to one extreme position and operable in another direction to another extreme position, said lever having a normal or neutral position between its extreme positions, means biasing said shift lever to its neutral position, and actuating member operatively connected to said shift lever and movable therewith, an actuated member including a longitudinally movable and rotatable shaft having a coaxial disk thereon, said actuating member comprising a U-shaped part whose arms are disposed at opposite sides of and spaced from said disk when said actuating member is in its neutral position, one of said arms of said actuating member engaging said disk to actuate said actuated member in one direction when said lever is moved out of its neutral position to one of its said extreme positions and the other of said arms engaging said disk to actuate said actuated member in the other direction when said lever is moved from its neutral position to the other of its extreme positions, said actuated member being moved to a first control position when said lever is moved to one extreme position and said actuated member being moved to another control position when said lever is moved to its other extreme position, said actuating member comprising a rod pivotally connected at one end to said shift lever, a guide mounting the other end of said rod for longitudinal sliding movement upon swinging of said lever and said U-shaped part being mounted on said rod, said means biasing said shift lever to its neutral position comprising a compression spring at each of opposite sides of said guide and interposed between said guide and a collar on said rod, and means controlled by said actuated member in accordance with the position of said actuated member.

References Cited in the file of this patent

UNITED STATES PATENTS 335,106     Brett _____ Feb. 2, 1886
804,971     Packard et al. _____ Nov. 21, 1905

(Other references on following page)

UNITED STATES PATENTS

| | | |
|---|---|---|
| 974,112 | Bechoff | Nov. 1, 1910 |
| 1,104,161 | Bacon | July 21, 1914 |
| 1,413,426 | Riddick | Apr. 18, 1922 |
| 1,547,009 | Anderson | July 21, 1925 |
| 1,682,643 | Varoutsos | Aug. 28, 1928 |
| 1,709,742 | Ruston | April 16, 1929 |
| 1,809,965 | Felton | June 16, 1931 |
| 1,904,151 | Leyes | Apr. 18, 1933 |
| 1,996,319 | Blair | Apr. 2, 1935 |
| 2,062,824 | Rockwell et al. | Dec. 1, 1936 |
| 2,390,513 | Couse | Dec. 11, 1945 |
| 2,434,791 | Couse | Jan. 20, 1948 |
| 2,453,255 | Olander | Nov. 9, 1948 |
| 2,588,565 | Pealer | Mar. 11, 1952 |
| 2,662,942 | Winkler | Dec. 15, 1953 |